# 3,056,775
PROCESS FOR THE PRODUCTION OF NEW N-HETEROCYCLIC COMPOUNDS

Walter Schindler, Riehen, near Basel, Switzerland, assignor to Geigy Chemical Corporation, Ardsley, N.Y., a corporation of Delaware
No Drawing. Filed Dec. 4, 1959, Ser. No. 857,275
Claims priority, application Switzerland Dec. 6, 1958
3 Claims. (Cl. 260—239)

The present invention concerns new N-heterocyclic compounds which are valuable starting materials for the synthesis of pharmaceuticals, as well as a process for the production of these compounds.

Up to now, 3-alkyl- or 3-alkanoyl-10.11-dihydro-5-dibenzo[b.f]azepines and 3-alkyl-5-dibenzo[b.f]azepines and derivatives thereof have not been known. It has now been found that such compounds of the formula selected from the group consisting of

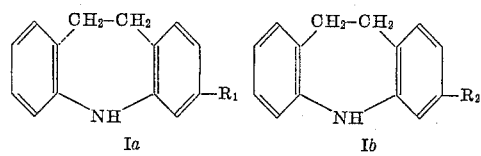

and

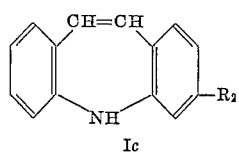

wherein $R_1$ represents an alkanoyl radical with 2–4 carbon atoms and $R_2$ represents an alkyl radical with 2–4 carbon atoms, which compounds will be termed in the following as 3-alkyl iminodibenzyls, 3-alkanoyl iminodibenzyls or 3-alkyl iminostilbenes, can be produced by reacting a 5-acyl iminodibenzyl (5-acyl-10.11-dihydro-5-dibenzo[b.f]azepine) in the presence of a Friedel-Crafts condensing agent with a halide or anhydride of an alkane carboxylic acid having 2–4 carbon atoms, hydrolysing the 3-alkanoyl-5-acyl iminodibenzyl obtained to a 3-alkanoyl iminodibenzyl corresponding to general Formula $Ia$ and, if desired, reducing the latter by treatment with hydrazine and an alkali hydroxide or alkali metal alcoholate according to Wolff-Kishner, if desired, converting the 3-alkyl iminodibenzyl obtained into a 5-acyl derivative which can easily be split, reacting this with halogen or with a compound giving off halogen, in particular with N-bromosuccinimide, reacting the 3-alkyl-5-acyl-10-halogen iminodibenzyl formed with an agent which splits off hydrogen halide and hydrolysing the 3-alkyl-5-acyl iminostilbene or the 3-alkyl-5-acyl iminodibenzyl obtained above to a compound of the general Formula $Ib$ or $Ic$, the hydrolysis possibly being performed at the same time as the hydrogen halide is split off.

As 5-acyl compound of iminodibenzyl, 5-acetyl iminodibenzyl is particularly suitable; it is easily obtained for example by boiling iminodibenzyl with acetyl chloride under reflux. The chlorides and bromides of acetic acid, propionic acid, n-butyric acid and isobutyric acid can be named as halides of alkane carboxylic acids having 2–4 carbon atoms. Another easily accessible starting material is acetic anhydride. In addition to aluminium chloride, for example, boron trifluoride, aluminium bromide and ferric chloride are further Friedel-Crafts condensing agents and examples of solvents or diluents are carbon disulphide, nitrobenzene or chlorobenzene.

The 3-alkanoyl-5-acyl iminodibenzyls obtained by the Friedel-Crafts condensation can be hydrolysed for example with alcoholic potassium lye easily to form 3-alkanoyl iminodibenzyls. The latter can be reduced, for example, with hydrazine hydrate and potassium hydroxide in a water soluble, higher boiling organic solvent such as ethylene glycol, diethylene glycol or triethylene glycol. During the reaction, the water added with the hydrazine hydrate and that liberated during the hydrazone formation is distilled off in the usual way and the reaction mixture is then heated further. The 3-alkanoyl iminodibenzyls having an alkanoyl radical of 2–4 carbon atoms can also serve as starting materials for other reactions, for example they can be substituted in the 5-position.

3-alkanoyl iminodibenzyl derivatives substituted in the 5-position by the group

wherein Z represents an alkylene radical having 2–6 carbon atoms in a straight or branched chain, and $R_2$ and $R_3$ represent low molecular alkyl radicals, for example 3-acetyl-5-(γ-dimethylaminopropyl)-iminodibenzyl, have for example, valuable pharmacological properties, in particular anti-allergic, spasmolytic, anticonvulsive and sedative activity. They potentiate the action of other pharmaceuticals, in particular anaesthetics, and are serotonin antagonists. They can be used therapeutically, among other purposes, for the treatment of certain forms of mental disorders.

If a 3-alkyl iminostilbene is to be obtained as end product, the 3-alkyl iminodibenzyl obtained in the reduction is converted, for example by boiling with excess acetyl chloride, into its 5-acetyl compound. In the next step, N-bromosuccinimide is suitable as compound giving off halogen but also, e.g. N-chlorosuccinimide, N-bromophthalimide, N.N'-dibromo-dimethyl hydantoin and N-bromoacetamide can be used. The splitting off of hydrogen halide and the hydrolysis can be performed, for example, in one step by means af alkali lye in the warm. By treating 3-alkyl-5-acyl-10-halogen iminodibenzyls with a tertiary organic base such as, e.g. collodine, in the warm, or by reacting with an alkali lye in the cold, the 3-alkyl-5-acyl iminostilbenes are obtained, the hydrolysis of which can also be performed in the warm by means of alkali lye.

The 3-alkyl iminodibenzyls and 3-alkyl iminostilbenes produced according to the invention can be substituted in many ways in their imino group. For example, compounds having valuable anti-allergic, spasmolytic, anticonvulsive, sedative and psychotherapeutic properties such as, e.g. 3-ethyl-5-(β-dimethylamino-ethyl)-iminodibenzyl, 3-ethyl-5-(γ-dimethylamino-propyl)-iminodibenzyl, 3-ethyl-5-(β-pyrrolidino-ethyl)-iminodibenzyl, 3-ethyl-5-[γ-(4-methyl-piperazino)-propyl]-iminodibenzyl, 3-n-propyl-5-(γ-dimethylamino-propyl)-iminodibenzyl and 3-ethyl-5-(γ-dimethylamino-propyl)-iminostilbene, are obtained by reacting 3-ethyl-iminodibenzyl, 3-n-propyl iminodibenzyl or 3-ethyl iminostilbene with the corresponding dimethylamino alkyl chlorides, with pyrrolidino ethyl chloride or with γ-(4-methyl-piperazino)-propyl chloride in the presence of sodium amide or lithium amide.

The following example further illustrates the production according to the invention of the new compounds. Parts are given therein as parts by weight and their relationship to parts by volume is as grammes to cubic centimetres. The temperatures are in degrees centigrade.

Example (a) 119 parts of 5-acetyl iminodibenzyl (M.P. 95–96°) and 150 parts of acetyl chloride dissolved in 300 parts by volume of carbon disulphide, are added dropwise while stirring to a mixture of 300 parts of aluminium chloride and 600 parts by volume of carbon disulphide. The reaction mixture is then stirred for 1 hour at room temperature and is then refluxed for 16 hours. It is then cooled and the supernatant carbon disulphide is poured off. The remaining content of the flask is then poured carefully while stirring into a mixture of 600 parts of ice and 12 parts by volume of concentrated hydrochloric acid. The crystals which separate are filtered off under suction, thoroughly washed with water, dried and recrystallised from a lot of ether. The 3.5-diacetyl iminodibenzyl so obtained melts at 143–144°.

(b) 140 parts of 3.5-diacetyl iminodibenzyl are refluxed while stirring with 1400 parts by volume of ethanol, 50 parts of potassium hydroxide and 100 parts of water for 12 hours. The ethanol is then distilled off, the residue is poured onto ice, the 3-acetyl iminodibenzyl which separates is filtered off under suction and recrystallised from ethanol whereupon it melts at 156–157°.

(c) 60 parts of 3-acetyl iminodibenzyl, 41.5 parts of potassium hydroxide, 42 parts by volume of aqueous 64% hydrazine hydrate solution and 330 parts by volume of ethylene glycol are refluxed for 3 hours. The solvent is then distilled off until a boiling range of 190–195° is attained and the remaining reaction mixture is refluxed for another 4 hours. It is then cooled, poured onto ice, the oil which separates is taken up in ether, the ether solution is thoroughly washed with water, dried and concentrated. After recrystallisation from petroleum ether, the 3-ethyl iminodibenzyl which remains melts at 93–94°.

(d) 22.3 parts of 3-ethyl iminodibenzyl are dissolved in 100 parts by volume of anhydrous benzene and the solution is refluxed for 4 hours with 10 parts of acetyl chloride. The solvent and the excess acetyl chloride are then completely evaporated off in the vacuum and the residue is rectified in a high vacuum. The 3-ethyl-5-acetyl iminodibenzyl passes over at 165–167° under 0.006 mm. pressure and melts at 84–85° (from ether/petroleum ether).

(e) 13.3 parts of 3-ethyl-5-acetyl iminodibenzyl are dissolved in 133 parts by volume of carbon tetrachloride and the solution is refluxed for 30 minutes with 9.4 parts of N-bromosuccinimide while irradiating, introducing nitrogen and stirring. The supernatant succinimide is drawn off under suction and the filtrate is liberated from the carbon tetrachloride by distillation in the vacuum. The residue is dissolved in 40 parts by volume of alcohol, 3.5 parts of potassium hydroxide in 4 parts of water are added to the solution and the whole is left to stand for 1 hour. The solution is then poured into water, the reaction product which separates is taken up in ether, the ethereal solution is dried and concentrated. The residue is refluxed for 48 hours with a solution of 7.5 parts of potassium hydroxide in 40 parts by volume of anhydrous ethanol. After cooling the reaction mixture, the 3-ethyl iminostilbene which precipitates is filtered off, thoroughly washed with water, dried and recrystallised from anhydrous benzene. M.P. 186°.

On using propionyl chloride instead of acetyl chloride in the first step, by an analogous series of reactions, 3-propionyl-5-acetyl iminodibenzyl (M.P. 132°), 3-propionyl iminodibenzyl (M.P. 140°), 3-n-propyl iminodibenzyl (M.P. 74–75°) and 3-n-propyl iminostilbene are obtained.

3-ethyl iminostilbene is also obtained in an analogous manner if in the above reaction instead of reacting 5-acetyl iminodibenzyl with acetyl chloride in the presence of aluminium chloride, 5-propionyl iminodibenzyl is reacted with acetyl bromide or acetic anhydride in the presence of ferric chloride; or if N.N'-dibromodimethyl hydantoin is used instead of N-bromosuccinimide.

What I claim is:
1. N-heterocyclic compounds of the formula

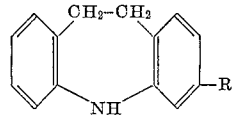

Ia wherein $R_1$ represents alkanoyl with 2–4 carbon atoms.
2. 3-acetyl iminodibenzyl.
3. 3-propionyl iminodibenzyl.

References Cited in the file of this patent
FOREIGN PATENTS

| | | |
|---|---|---|
| 200,579 | Austria | Nov. 10, 1958 |
| 215,335 | Australia | June 11, 1958 |